United States Patent
Lee et al.

(10) Patent No.: US 8,446,825 B2
(45) Date of Patent: May 21, 2013

(54) METHOD AND SYSTEM FOR RELIABLE SERVICE PERIOD ALLOCATION IN 60 GHZ MAC

(75) Inventors: HyungJune Lee, San Jose, CA (US); Rajesh Kumar Sinha, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 13/171,557

(22) Filed: Jun. 29, 2011

(65) Prior Publication Data

US 2013/0003662 A1   Jan. 3, 2013

(51) Int. Cl.
*H04L 12/26* (2006.01)
(52) U.S. Cl.
USPC ....................................... 370/231; 370/310.2

(58) Field of Classification Search
USPC .............. 370/229, 230, 231, 235, 310.2, 328, 370/338, 349
See application file for complete search history.

(56) References Cited

U.S. PATENT DOCUMENTS 6,947,445 B1 *  9/2005  Barnhart ........................ 370/468
7,643,456 B2 *  1/2010  Jouppi et al. ................... 370/338

* cited by examiner

*Primary Examiner* — Brenda H Pham
(74) *Attorney, Agent, or Firm* — Garlick & Markison

(57) ABSTRACT

A technique to send service period allocation from a network control point to a plurality of stations using an Announce frame of a 60 GHz DBand specification. The use of the Announce frame ensures that the control point receives confirmation of the service period allocation assigned to the stations before data transfer is permitted between the stations.

20 Claims, 8 Drawing Sheets

METHOD AND SYSTEM FOR RELIABLE SERVICE PERIOD ALLOCATION IN 60 GHZ MAC

TECHNICAL FIELD OF THE INVENTION

The embodiments of the invention relate to wireless communications and, more particularly, to service period allocation at and above 60 GHz Band.

DESCRIPTION OF RELATED ART

Various wireless communication systems are known today to provide links between devices, whether directly or through a network. Such communication systems range from national and/or international cellular telephone systems, the Internet, point-to-point in-home systems, as well as other systems. Communication systems typically operate in accordance with one or more communication standards or protocol. For instance, wireless communication systems may operate using protocols, such as IEEE 802.11, Bluetooth™, advanced mobile phone services (AMPS), digital AMPS, global system for mobile communications (GSM), code division multiple access (CDMA), local multi-point distribution systems (LMDS), multi-channel-multi-point distribution systems (MMDS), as well as others.

For each wireless communication device to participate in wireless communications, it generally includes a built-in radio transceiver (i.e., receiver and transmitter) or is coupled to an associated radio transceiver (e.g., a station for in-home and/or in-building wireless communication networks, modem, etc.). Typically, the transceiver includes a baseband processing stage and a radio frequency (RF) stage. The baseband processing provides the conversion from data to baseband signals for transmitting and baseband signals to data for receiving, in accordance with a particular wireless communication protocol. The baseband processing stage is coupled to a RF stage (transmitter section and receiver section) that provides the conversion between the baseband signals and RF signals. The RF stage may be a direct conversion transceiver that converts directly between baseband and RF or may include one or more intermediate frequency stage(s).

Furthermore, wireless devices typically operate within certain radio frequency ranges or band established by one or more communication standards or protocols. The 2.4 GHz Band that encompasses current WiFi and Bluetooth™ protocols have limited data throughput. A newer 60 GHz standard pursues higher throughput of up to 7 Gbps in short-range wireless data transmissions. Using 60 GHz technology, high data rate transfers, such as real-time uncompressed/compressed high-definition (HD) video and audio streams, may be transferred between two devices. Some examples of transfers between two devices under access point (AP) or personal control point (PCP) control include data transfers between a conference room projector and a laptop, between a camcorder and a display, or between a network storage server and a laptop. Other examples abound. Due to this inherent real-time requirement for the targeting applications, 60 GHz standard explicitly defines a Quality of Service (QoS) requirement, called Extended DBand TSPEC (Traffic Specification) for traffic streams to meet high throughput among devices.

The 60 GHz Extended DBand TSPEC describes the timing and traffic requirements of a traffic stream (TS) that exists within a network, such as a Personal Basic Service Set (PBSS) or infrastructure Basic Service Set (IBSS) operating in the 60 GHz Band, which is also referred to as D-Band (or DBand). This Extended DBand TSPEC specifies the allocation period over which the allocation repeats, minimum allocation time, maximum desirable allocation time, and minimum service period (SP) allocation time, which are parts of time schedule related information, thereby distinguishing the DBand TSPEC from the general TSPEC of traditional wireless local area network (WLAN), such as a network using one of the 2.4 GHz 802.11 communications. A purpose of the Extended DBand TSPEC is for the initial creation and modification of SPs and their allocation for the transmission of data frames between DBand stations (STAs) operating in the 60 GHz DBand that are members of a PBSS or IBSS.

When a DBand STA requests time allocation for a TS to an AP device, such as a router, the DBand STA sends an add traffic stream request (Extended ADDTS Request) frame with the requesting Extended DBand TSPEC. The PCP/AP then determines whether it can accommodate the requested new TS and responds with an Extended ADDTS Response frame to inform the admission of the requested TS. After this, the PCP/AP sends the scheduled allocation information of the SP in the format of an Extended Schedule Information Element (Extended Schedule IE or ExSchIE).

Traditional wireless communication technology (e.g. 2.4 GHz, 802.11 communications) generally relies on broadcasting the allocation information to all of the STAs, whether using beacons, or not. When the SP is allocated, the SP allocation information is broadcast to all of the STAs, such as through a beacon, and informs all of the STA's as to the respective SPs. With this approach, once the SP allocation is made by a PCP/AP, the PCP/AP assumes that each DBand STA has received the information regarding the SP allocation. This known technique may also be applied to the 60 GHz DBand, however with throughput limiting consequences.

Although sending a DBand Beacon frame, that includes the allocated SP in the format of Extended Schedule IE is a simple and straightforward way for informing participating DBand STAs of the allocated information, the beacon frame is transmitted by broadcast, and therefore does not require any acknowledgment from the target DBand STAs. In this instance, the DBand beacon employs the same or similar technique as the traditional wireless technology. With this traditional scheme, the AP need not have a clear and visible way to check if participating DBand STAs received those scheduling SP information, before initiating access to the medium, and carrying out the data transfer for the traffic stream during the scheduled SP period, while still meeting QoS requirement. If one or more STAs did not receive the allocated SP, the PCP/AP is not aware of this fact and proceeds as though the allocated SP data transfer is to occur. When a data transfer does not occur or data is lost, due to the missed SP allocation and depending on who missed the SP allocation information, the devices need to renegotiate with the PCP/AP again to effect the transfer. This may cause throughput problems for time critical traffic streams. Also, since devices operating in the 60 GHz DBand typically use directional antennas, beacon frames are sent out to multiple sectors by one-on-one broadcast, which is inherently spectrally-inefficient. These drawbacks, not only lead to lower throughput of time critical data, but may also lead to higher power consumption, which could be a limiting factor in battery powered portable handheld devices.

Accordingly, there is a need to obtain a much more efficient way to provide SP allocation to devices operating in higher frequency bands, such as the 60 GHz DBand, and especially in instances where directional antennas are employed within a network for wireless communication.

DETAILED DESCRIPTION OF THE INVENTION

The embodiments of the present invention may be practiced in a variety of wireless communication devices that operate in a wireless network. The examples described herein pertain to devices that operate approximately within the 60 GHz Band, which is referred to as DBand. However, the invention need not be limited to the 60 GHz Band. Furthermore, the examples described herein pertain to specific designations, such as Service Period, Announce frame, Beacon frame, Extended Schedule Information Element, etc. However, the invention need not be limited to such specific applications.

Figure 1:
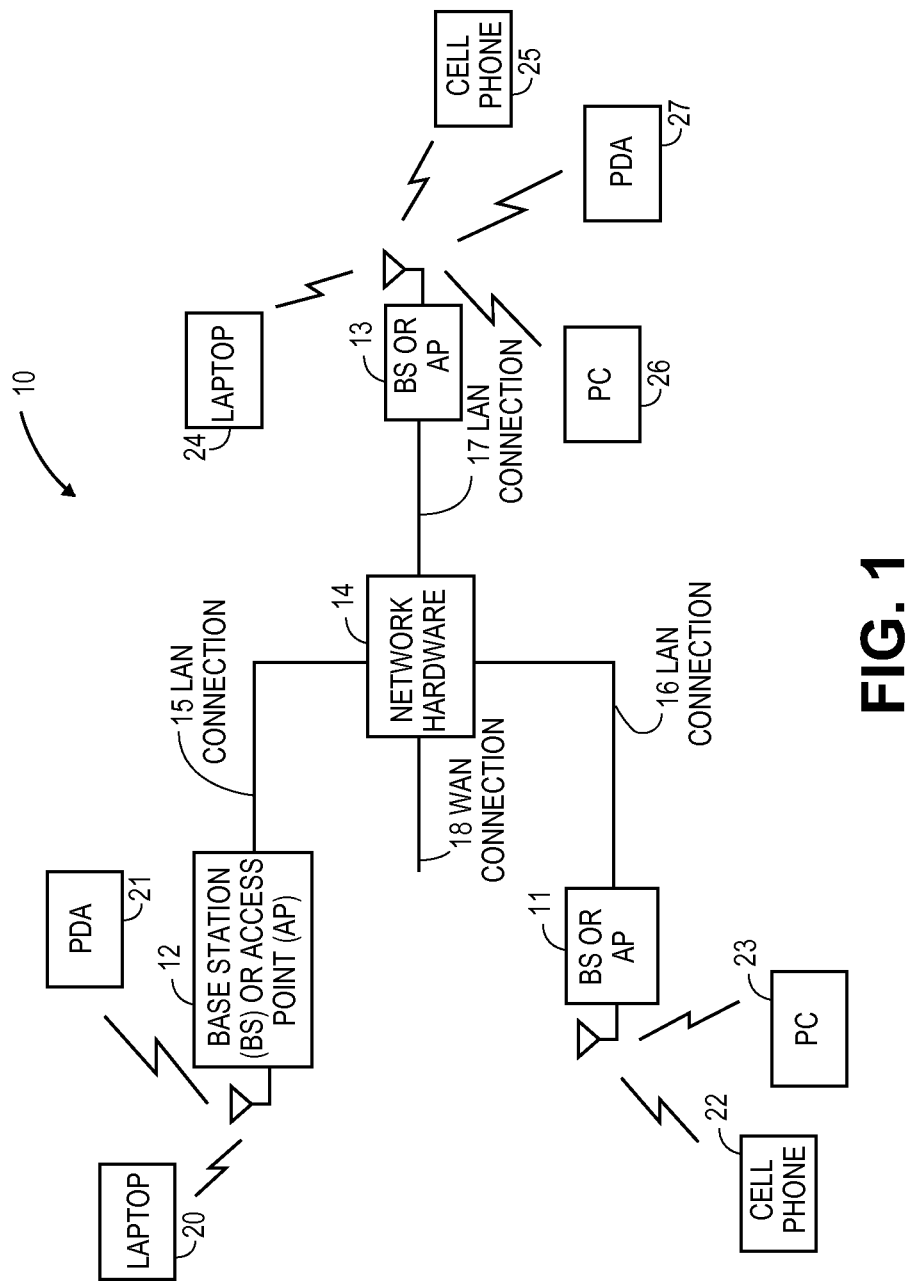
FIG. 1 is a block diagram showing a wireless communication system in accordance with one embodiment for practicing the present invention.

FIG. 1 illustrates one environment for practicing the present invention. FIG. 1 shows a communication system 10 that includes a plurality of base stations (BS), personal control point (PCP) and/or access points (AP) 11-13, a plurality of wireless communication devices 20-27 and a network hardware component 14. The wireless communication devices 20-27 may be laptop computers 20 and 24, personal digital assistants 21 and 27, personal computers 23 and 26, cellular telephones 22 and 25, and/or any other type of device that supports wireless communications.

The base stations or access points 11-13 may be operably coupled to network hardware 14 via respective local area network (LAN) connections 15-17. Network hardware 14, which may be a router, switch, bridge, modem, system controller, etc., may provide a wide area network (WAN) connection 18 for communication system 10. Individual base station or access point 11-13 generally has an associated antenna or antenna array to communicate with the wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems (including 3G and 4G systems) and like-type systems, while access points are used for in-home or in-building wireless networks. Regardless of the particular type of communication system, each wireless communication device includes a built-in radio and/or is coupled to a radio. The radio includes a linear amplifier and/or programmable multi-stage amplifier to enhance performance, reduce costs, reduce size, and/or enhance broadband applications. The radio also includes, or is coupled to, an antenna or antennas having a particular antenna coverage pattern for propagating of outbound RF signals and/or reception of inbound RF signals. Antennas may be directional antennas.

Figure 2:
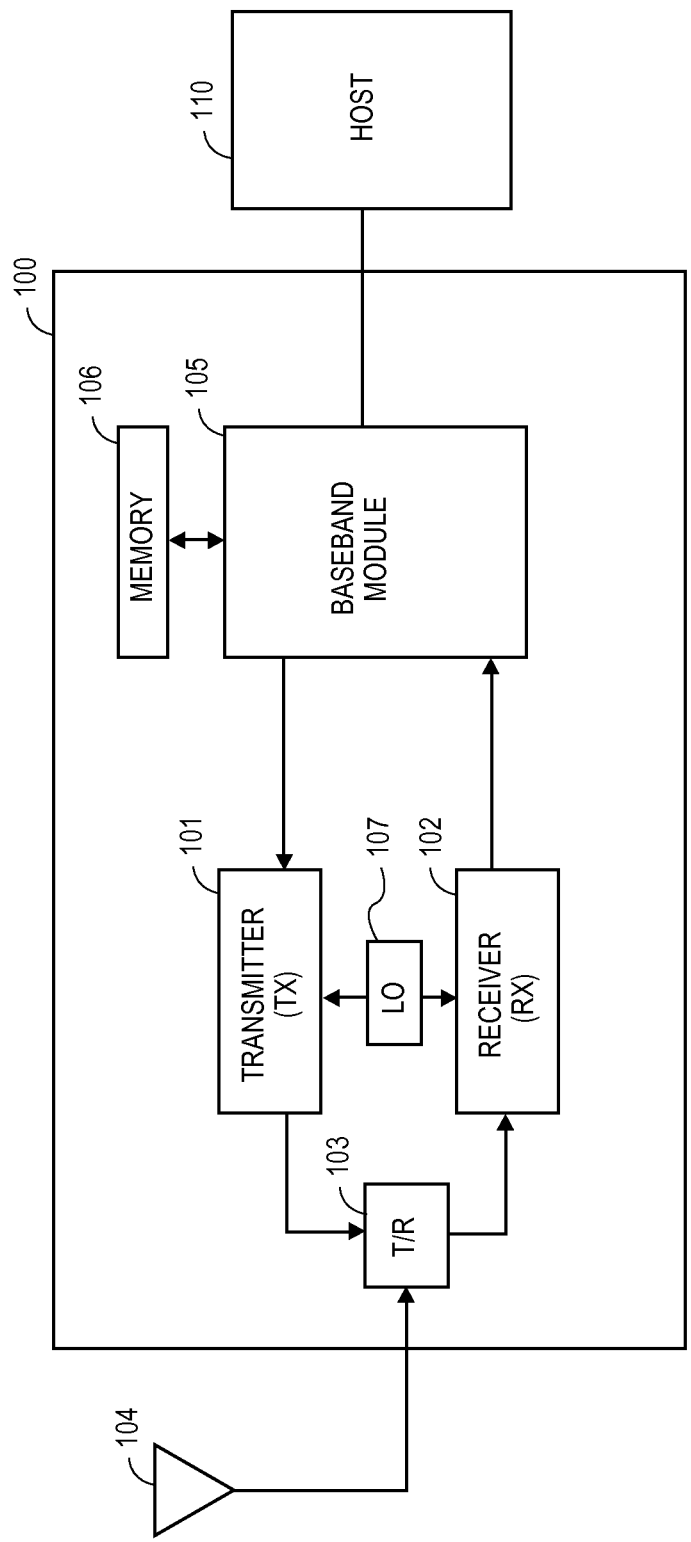
FIG. 2 is a schematic block diagram showing an embodiment of a wireless communication device for practicing the present invention.

FIG. 2 is a schematic block diagram illustrating part of a wireless communication device 100 that includes a transmitter (TX) 101, receiver (RX) 102, local oscillator (LO) 107 and baseband module 105. Baseband module 105 provides baseband processing operations. In some embodiments, baseband module 105 is or includes a digital-signal-processor (DSP). Baseband module 105 is typically coupled to a host unit, applications processor or other unit(s) that provides operational processing for the device and/or interface with a user.

In FIG. 2, a host unit 110 is shown. For example, in a notebook or laptop computer, host 110 may represent the computing portion of the computer, while device 100 is utilized to provide WiFi and/or Bluetooth components for communicating wirelessly between the computer and an access point and/or between the computer and a Bluetooth device. Similarly, for a handheld audio or video device, host 110 may represent the application portion of the handheld device, while device 100 is utilized to provide WiFi and/or Bluetooth components for communicating wirelessly between the handheld device and an access point and/or between the handheld device and a Bluetooth device. Alternatively, for a mobile telephone, such as a cellular phone, device 100 may represent the radio frequency (RF) and baseband portions of the phone and host 110 may provide the user application/interface portion of the phone. Furthermore, device 100 may be incorporated in one or more of the wireless communication devices 20-27 shown in FIG. 1.

A memory 106 is shown coupled to baseband module 105, which memory 106 may be utilized to store data, as well as program instructions that operate on baseband module 105. Various types of memory devices may be utilized for memory 106. It is to be noted that memory 106 may be located anywhere within device 100 and, in one instance, it may also be part of baseband module 105.

Transmitter 101 and receiver 102 are coupled to an antenna 104 via transmit/receive (T/R) switch module 103. T/R switch module 103 switches the antenna between the transmitter and receiver depending on the mode of operation. In other embodiments, separate antennas may be used for transmitter 101 and receiver 102, respectively. Furthermore, in other embodiments, multiple antennas or antenna arrays may be utilized with device 100 to provide antenna diversity or multiple input and/or multiple output, such as MIMO, capabilities.

At frequencies in the lower gigahertz range, omni-directional antennas provide adequate coverage for communicating between wireless devices. Thus, at frequencies about 2.4-5.8 GHz, one or more omni-directional antenna(s) is/are typically available for transmitting and receiving. However, at higher frequencies, directional antennas with beam-forming capabilities are utilized to direct the beam to concentrate the transmitted energy, due to the limited range of the signal.

In these instances, antenna arrays allow for directing the beam in a particular direction. The 60 GHz DBand as specified by the Wireless gigabit Alliance (WGA or WiGig), specifies that DBand devices utilize directional antennas in order to direct the transmitted spectrum energy.

Outbound data for transmission from host unit 110 are coupled to baseband module 105 and converted to baseband signals and then coupled to transmitter 101. Transmitter 101 converts the baseband signals to outbound radio frequency (RF) signals for transmission from device 100 via antenna 104. Transmitter 101 may utilize one of a variety of up-conversion or modulation techniques to convert the outbound baseband signals to outbound RF signal. Generally, the conversion process is dependent on the particular communication standard or protocol being utilized.

In a similar manner, inbound RF signals are received by antenna 104 and coupled to receiver 102. Receiver 102 then converts the inbound RF signals to inbound baseband signals, which are then coupled to baseband module 105. Receiver 102 may utilize one of a variety of down-conversion or demodulation techniques to convert the inbound RF signals to inbound baseband signals. The inbound baseband signals are processed by baseband module 105 and inbound data is output from baseband module 105 to host unit 110.

LO 107 provides local oscillation signals for use by transmitter 101 for up-conversion and by receiver 102 for down-conversion. In some embodiments, separate LOs may be used for transmitter 101 and receiver 102. Although a variety of LO circuitry may be used, in some embodiments, a PLL is utilized to lock the LO to output a frequency stable LO signal based on a selected channel frequency.

It is to be noted that in one embodiment, baseband module 105, LO 107, transmitter 101 and receiver 102 are integrated on the same integrated circuit (IC) chip. Transmitter 101 and receiver 102 are typically referred to as the RF front-end. In other embodiments, one or more of these components may be on separate IC chips. Similarly, other components shown in FIG. 2 may be incorporated on the same IC chip, along with baseband module 105, LO 107, transmitter 101 and receiver 102. In some embodiments, the antenna 104 may also be incorporated on the same IC chip as well. Furthermore, with the advent of system-on-chip (SOC) integration, host devices, application processors and/or user interfaces, such as host unit 110, may be integrated on the same IC chip along with baseband module 105, transmitter 101 and receiver 102.

Additionally, although one transmitter 101 and one receiver 102 are shown, it is to be noted that other embodiments may utilize multiple transmitter units and receiver units, as well as multiple LOs. For example, diversity communication and/or multiple input and/or multiple output communications, such as multiple-input-multiple-output (MIMO) communication, may utilize multiple transmitters 101 and/or receivers 102 as part of the RF front-end.

Figure 3:
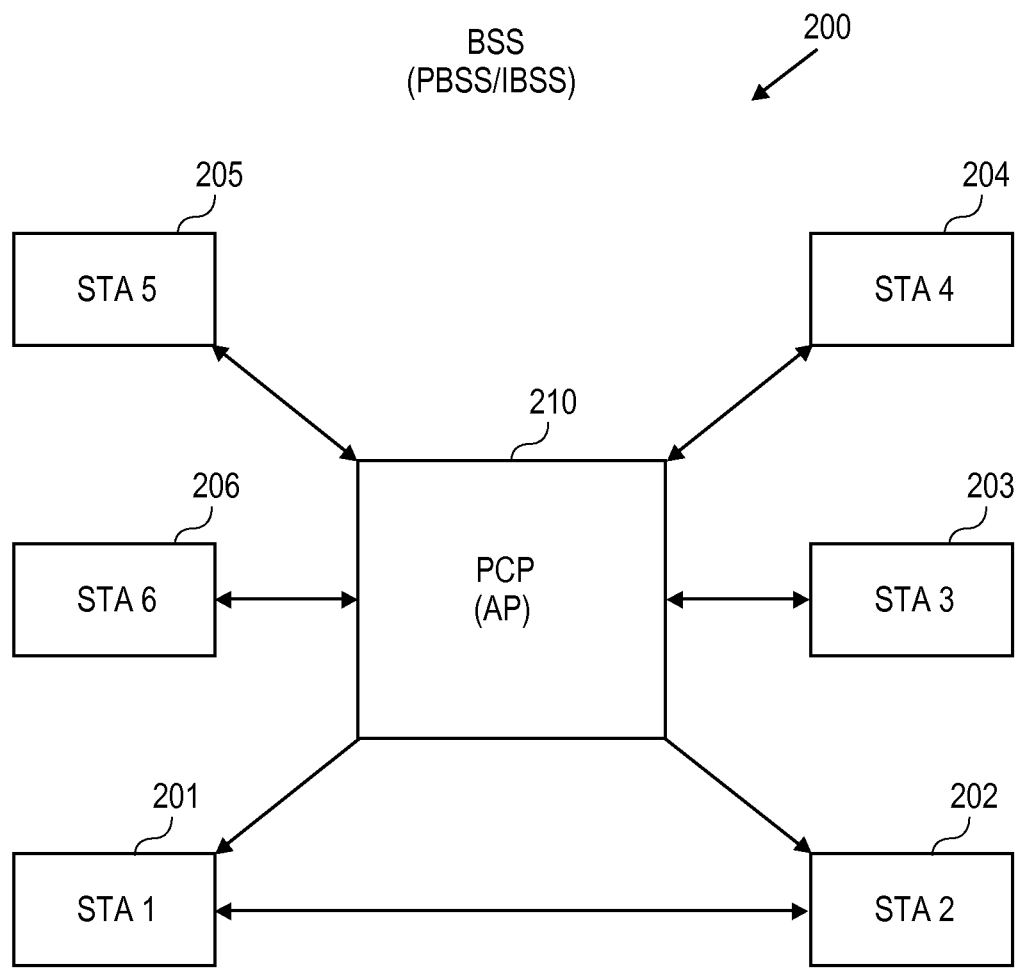
FIG. 3 is a block diagram of a Basic Service Set (BSS), in which multiple STAs are present in the network and allocations of service periods for the STAs are controlled by a network control point in practicing one embodiment of the invention.

FIG. 3 shows wireless network which forms or is part of a Basic Service Set (BSS) 200. In one embodiment BSS 200 is a Personal Basic Service Set (PBSS) that forms a personal network. In another embodiment BSS 200 may be an infrastructure Basic Service Set (IBSS) that forms a much larger infrastructure network. Still in other embodiments, BSS 200 may form other networks, including a combination of wireless and wired networks.

In the shown embodiment, BSS 200 is comprised of a control point and a plurality of stations (STAs) 201-206 (also noted as STA1-STA6), which STAs 201-206 are under control of a control point. It is to be noted that only 6 STAs are shown, but BSS 200 may be comprised of less STAs or more STAs than is shown. The control point may be a Personal Control Point (PCP), Access Point (AP), or some other device. Hereinafter in the description, the control point is referred to as PCP 210. Note that PCP 210 may be implemented as or as part of BS/AP 11-13 of FIG. 1. Likewise, STAs 201-206 may be equivalent to the devices shown about each of BS/AP 11-13.

BSS 200 employs a particular communication protocol or standard to provide the wireless communication among the devices within BSS 200. In one embodiment, BSS 200 operates within the 60 GHz DBand as specified by WGA. In other embodiments, BSS 200 may operate in other bands or frequency ranges. When operating in the 60 GHz DBand, components within BSS 200 use directional antennas to direct the transmitted beam. Thus, PCP 210 and STAs 201-206 each utilize a directional antenna to communicate with each other within BSS 200.

Each STA communicates with PCP 210 and may communicate with other STAs through PCP 210. However, one or more STAs may also communicate directly with other STAs through direct peer-to-peer link, as shown by a direct connection between STA1 and STA2 in FIG. 3. However, this direct communication is still under control of PCP 210. That is, the bandwidth for BSS 200 is under control of PCP 210, so that PCP 210 allocates the service period (SP) to each of the STAs in order to control BSS traffic and bandwidth.

In a typical 60 GHz DBand application, a traffic stream (TS) is established between two DBand STAs or between DBand STA and PCP 210. When two STAs communicate one STA is the source STA and the other STA is the destination STA. For example, STA1 may be the source STA and STA2 may be the destination STA in FIG. 3. The source STA sends an ADDTS Request frame to PCP 210 to initiate the link for transferring data to the destination STA. The ADDTS request carries Extended DBand TSPEC which defines the timing and traffic requirements. Once the TS is admitted by Media Access Control (MAC) of PCP 210, a scheduler within PCP 210 allocates the applicable SP and announces the SP allocation information as a part of the Extended Schedule Information Element (ExSchIE). PCP 210 then transmits the ExSchIE to both the source DBand STA and destination DBand STA for a specific TSPEC. The DBand STAs receive and parse the ExSchIE from the received frame, and become aware of the start time, the duration, and the period of the SP allocation for that station. Subsequently, the two STAs will initiate the data transfer at the designated SP time slot or slots.

If PCP 210 uses the traditional beacon approach to announce SP allocation to the involved DBand STAs, the DBand STA which receives any relevant ExSchIE to itself does not send an acknowledgment to PCP 210. Accordingly, even if an involved DBand STAs does not successfully receive the beacon that includes the allocated SP, PCP 210 cannot check the reception status, and therefore loses the controllability for QoS TSPEC requirement. For example, if the source DBand STA does not receive the allocated SP schedule information, and destination DBand STA does, then the destination DBand STA just waits for data frames from the source DBand STA, while wasting time and bandwidth. On the other hand, if the destination DBand STA does not receive the ExSchIE, and the source DBand STA does, then the source DBand STA will transmit data frames, but the transmitted data will not be received by the destination DBand STA, which results in data loss. Again, time and bandwidth would be wasted. Due to the lost time allocation, the promised QoS TSPEC requirement is not met. Thus, relying on the traditional beacon to send ExSchIE that contains the allocated SP may be sufficient for non-time critical data transfers, but for those time critical data, the QoS TSPEC requirement may not be met.

Figure 4:
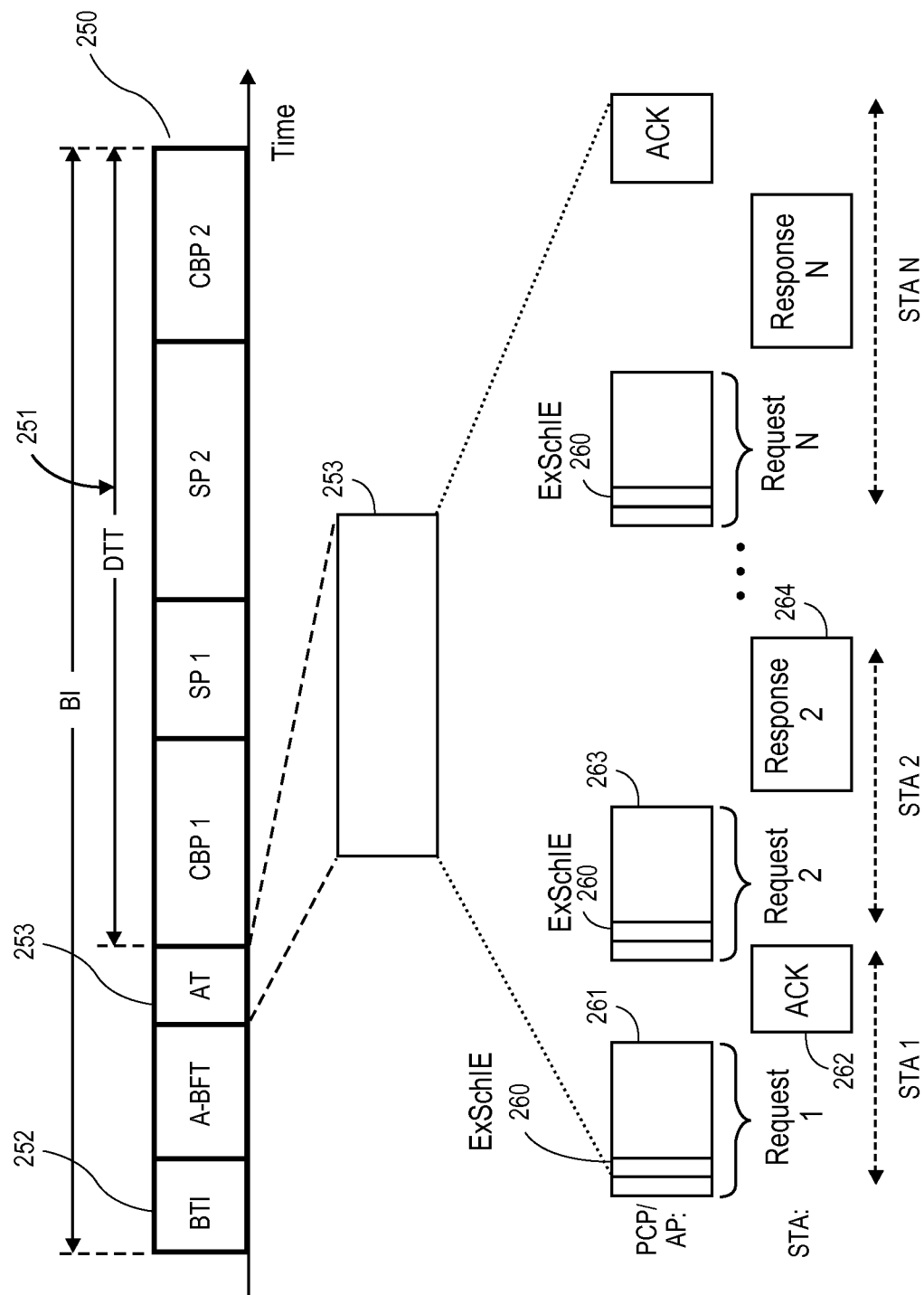
FIG. 4 is an illustration of an example frame exchange within the BSS, in which SP allocation is provided by an Extended Schedule Information Element, in practicing one embodiment of the invention.

FIG. 4 shows an exemplary beacon signal having a Beacon Interval (BI) 250 under the WGA specification as applied to the 60 GHz DBand standard. BI 250 includes a plurality of frame periods as shown in FIG. 4. Beacon Time Interval (BTI) 252 is an interval (or period) that operates similar to traditional beacons. That is, BTI 252 contains one or more Beacon frame(s) that provide information that is broadcast to the various STAs within the network (e.g. BSS 200). BTI 252 is followed by A-BFT (Association-Beamforming Training Period) interval and then by Announcement Time (AT) interval (or period) 253. AT 253 contains one or more Announce frame(s). These three intervals do not contain data. After AT 253, a number of frames may be present to transfer data during Data Transfer Time (DTT) period 251. In FIG. 4, two CBP (Contention Based Period) and two SP periods are shown. Other DTT periods may have different arrangements of period data frames.

AT 253 is a polling-based management period where no data frame is allowed. The presence of the AT is optional. When AT 253 is present, its presence is signaled in BTI 252, along with the specified start time and duration for the next AT frame. From this information, participating DBand STAs become aware of the presence of AT 253.

Whereas BTI 252 is broadcast to all of the STAs, AT 253 is generally unicasted to the designated recipient. That is, broadcast is to multiple STAs in the BSS, whereas unicast is to one designated target destination within the BSS. Thus, during AT 253, PCP 210 sends request frames to DBand STAs, and the addressed DBand STA will send an acknowledgment or response frame back to PCP 210. To implement this procedure, PCP 210 first makes a sending order list for all awake DBand STAs in its BSS (such as BSS 200), depending on their power save status and schedule urgency. During each AT 253, PCP 210 sends a unicast Announce frame to a DBand STA one-by-one in the list, so that the DBand STA that receives the Announce frame may then respond by sending an acknowledgment or response. An acknowledgment to PCP 210 just acknowledges receipt, while a response management frame provides information or requests a certain action by PCP 210, such as requesting dynamic time slot allocation. The acknowledgement (ACK) frame or any management frame that PCP 210 receives from the DBand STA at this turn is considered as an acknowledgment and confirmation of reception of the original PCP 210 transmission. Because the ACK or management response is required from the designated STA when the Announce frame is present, no such response to PCP 210 is an indication that the original AT 253 transmission was not successful. After receiving the ACK or management frame, PCP 210 processes the received frame and then moves forward to send a management frame such as the next Announce frame to the next DBand STA in the list.

The allocated SP information in ExSchIE to one or more STAs may be sent from PCP 210 in a Beacon frame during BTI 252. However, this is a broadcast to all of the STAs in the BSS and follows procedures similar to sending SP allocation using traditional beacons. BTI 252 does not require an affirmative ACK or response from the target STA. Thus, if ExSchIE is sent during BTI 252, then the concerns expressed above with traditional beacons is encountered. However, if ExSchIE is sent during AT 253, PCP 210 is aware of any ExSchIE that is not received by the respective target STA.

As an example, if a source STA1 desires to send data to destination STA 2 in BSS 200 of FIG. 3, STA1 communicates with PCP 210 to obtain SP allocation. The SP allocation is placed within ExSchIE and transmitted from PCP 210. PCP 210 may send the ExSchIE in a Beacon frame during BTI 252 using traditional beacon technique, but this may result in wasted time and bandwidth with lost exchanges. The SP allocation may be sent with ExSchIE 260 during AT 253, in which SP allocation to one STA is sent during request frame 261 (Request1) and the SP allocation to the other STA is sent during a different request frame 263 (Request2). Both requests are sent unicast to the designated STA. FIG. 4 illustrates an ACK frame 262 in response to Request1 and a management response frame 264 (Response2) in response to Request2. Note that there may be further requests and responses as noted in FIG. 4. The ACK and other responses may be sent unicast as well.

Figure 5:
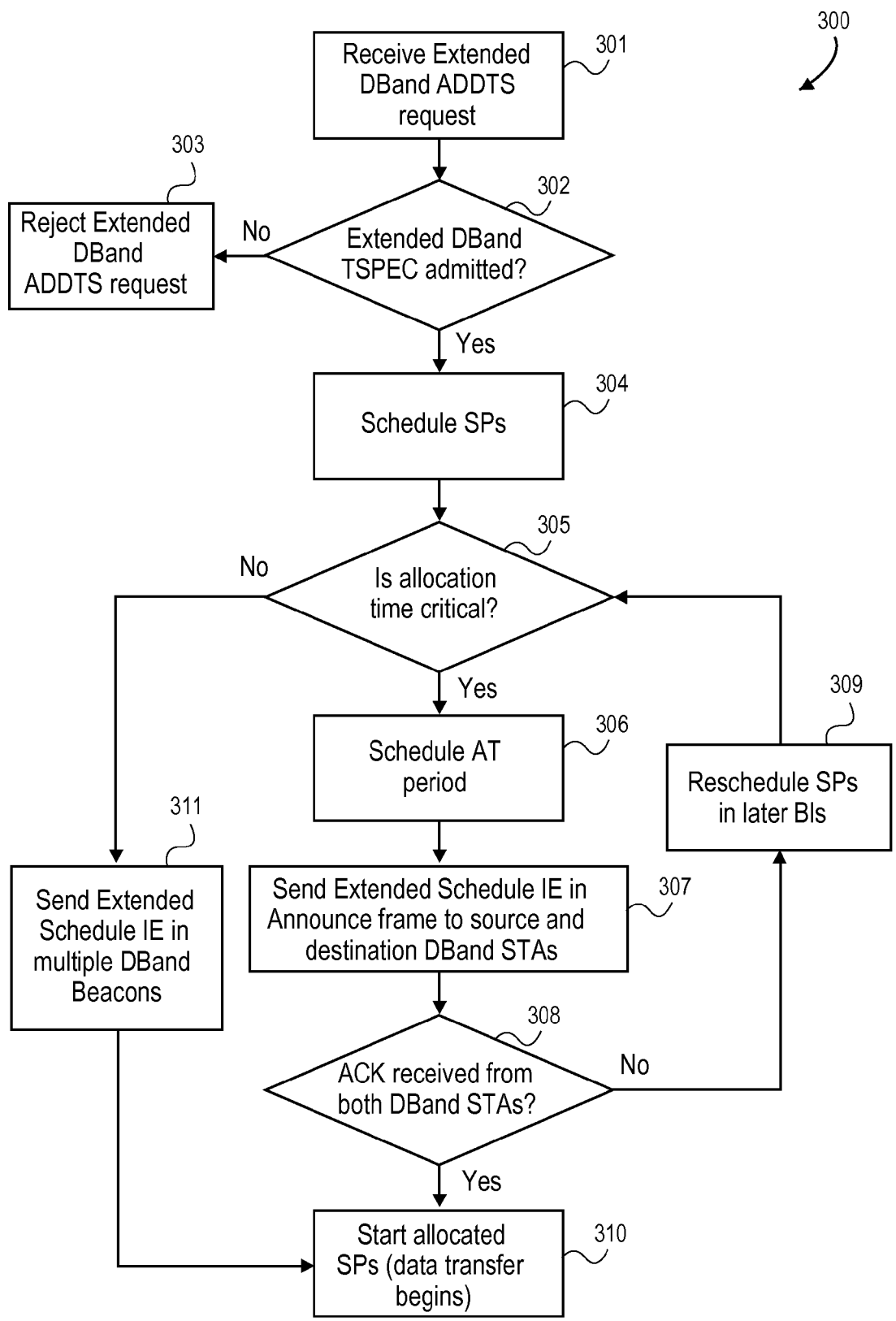
FIG. 5 is a flow chart showing a method for using an Announce frame for time critical SP allocation in practicing one embodiment of the invention.

FIG. 5 illustrates one method 300 of applying the SP allocation described above. The procedure may be applied within PCP 210 and in one embodiment, the procedure is applied at the media access control (MAC) level. An STA sends an Extended DBand TSPEC to PCP 210 requesting SP allocation (block 301). When the Extended DBand TSPEC is admitted (block 302), the scheduler in PCP 210 allocates SPs in future BIs (block 304). It may be that the Extended DBand TSPEC is not admitted (block 303), at which point allocation is not given. The PCP scheduler then checks to determine if the scheduling is time critical (block 305). A variety of conditions may be set to determine what is time critical data transfer. For example, in one embodiment, this may be checked by determining the commencement of the SP and comparing this start time to a threshold time. The threshold can be defined as 'x' number of BIs where 'x' is a design parameter. If the SP is to start at a much later BI than 'x' BI from the time of scheduling, this SP may be considered as non-time critical SP, in which case PCP 210 may broadcast the ExSchIE using a Beacon frame during BTI 252 (block 311).

If the SP is to start sooner than the threshold BI, this SP may be considered as time critical SP. Then, the scheduler of PCP 210 schedules an unicast of an Announce Frame during AT 253 (block 306). The ExSchIE with the SP allocation is sent to both source and destination DBand STAs (block 307). It is to be noted that PCP 210 schedules the SP start time to be a time later (after a delay period) than the time it expects to receive the response (ACK or management frame) from both source and destination STAs. Only if PCP 210 receives acknowledgments from both DBand STAs (block 308), does PCP 210 allow the participating STAs to start transferring data frames between the STAs at the designated SP time slot (block 310). If PCP 210 does not receive an acknowledgment from one or both of the participating DBand STAs (block 308), then PCP 210 reschedules the attempted SP time slots to later BIs (block 309), so that it can find alternative time slots which meet TSPEC requirement in later BIs.

Figure 6:
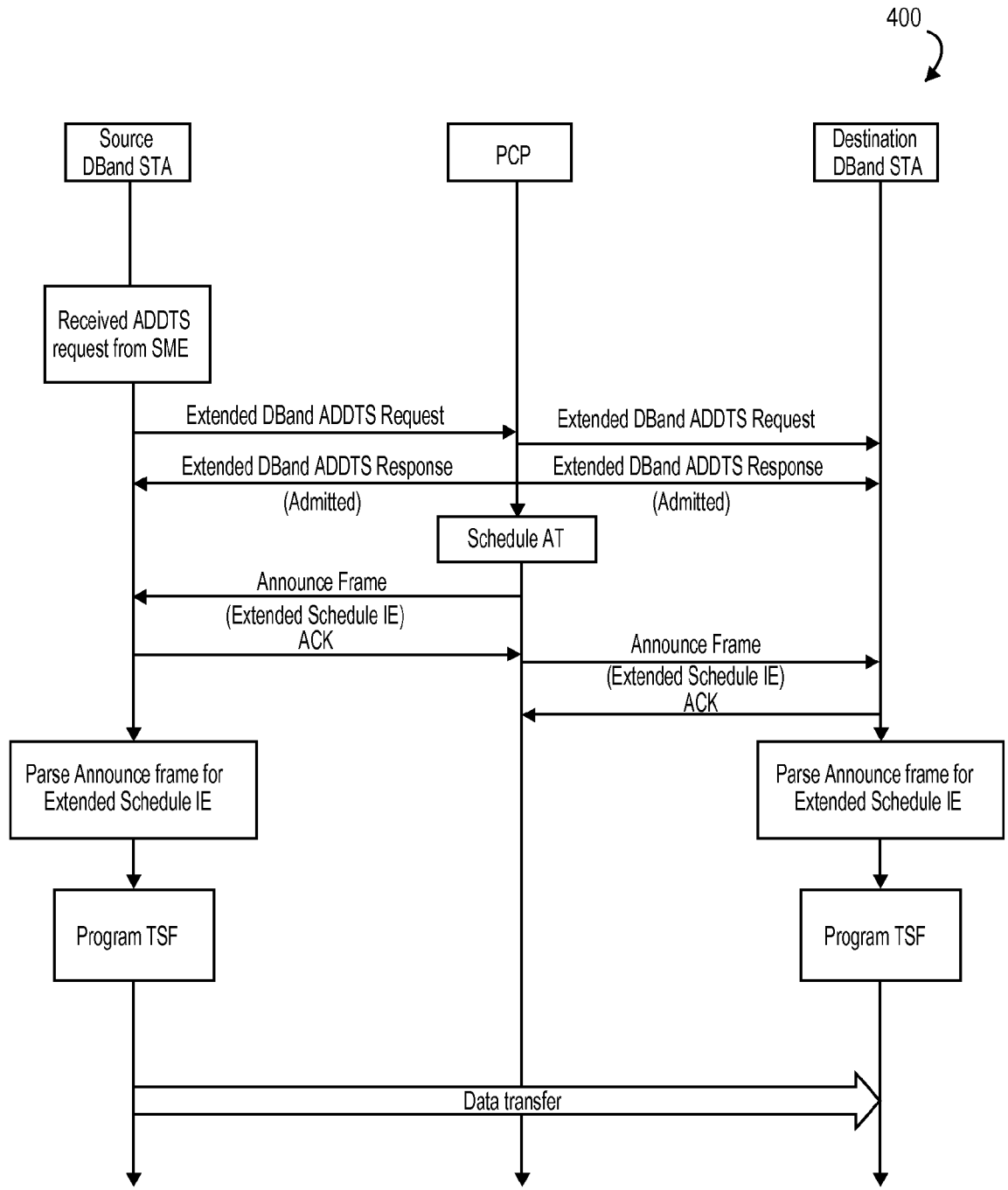
FIG. 6 is a diagram showing a messaging sequence that uses the Announce frame for time critical SP allocation for the method shown in FIG. 5 in practicing one embodiment of the invention.

FIG. 6 exemplifies a message sequence 400 between PCP 210 and the source and destination DBand STAs for time critical SP allocation. As noted above, Announce frames during AT 253 are used to transfer the SP allocation information for time-critical data. Note that the data transfer is permitted only after some response (ACK or management frame) is received from both source and destination STAs.

Figure 7:
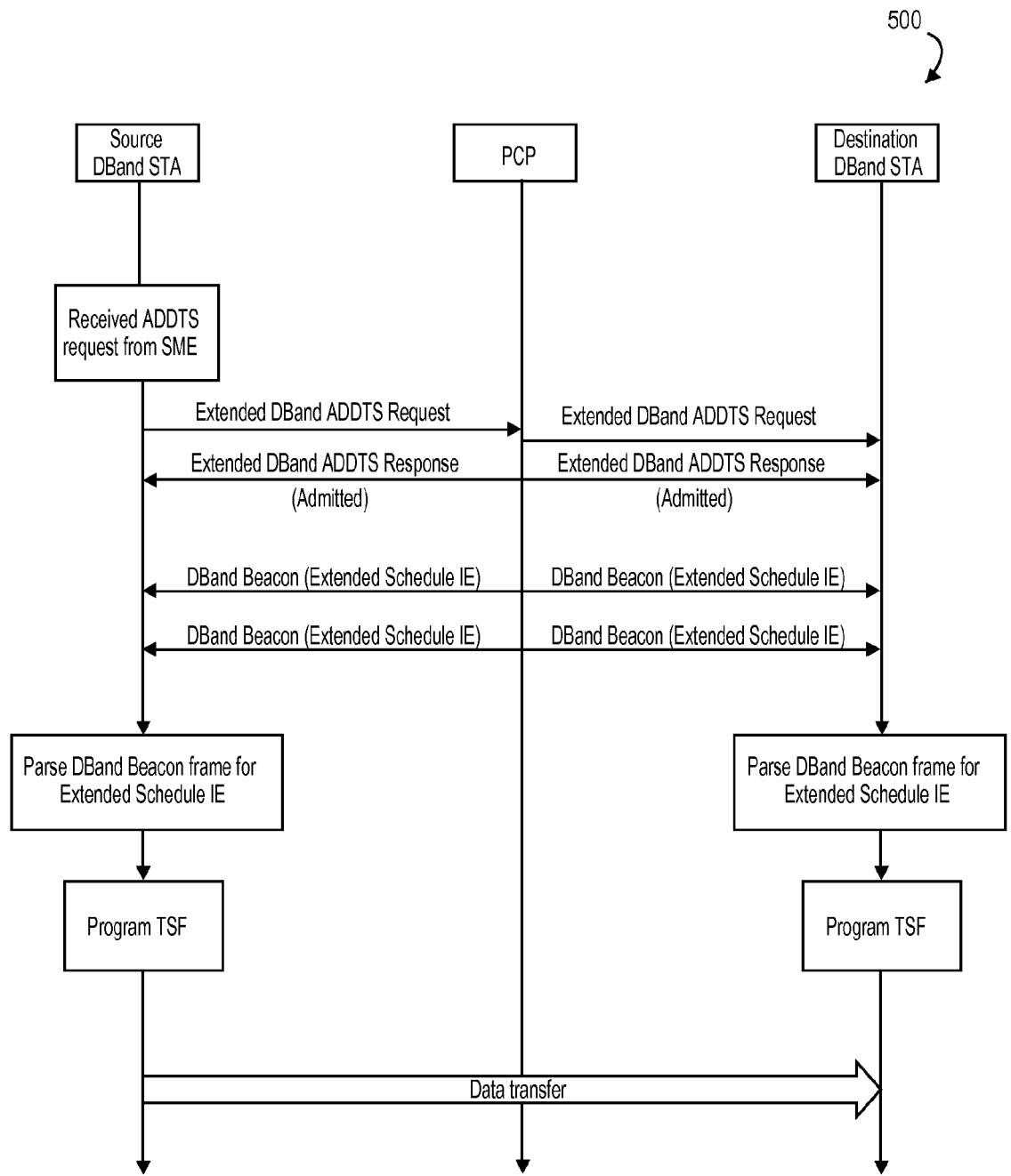
FIG. 7 is a diagram showing a messaging sequence that uses a DBand Beacon frame for non-time critical SP allocation for the method shown in FIG. 5 in practicing one embodiment of the invention.

FIG. 7 exemplifies a message sequence 500 between PCP 210 and the source and destination DBand STAs for non-time critical SP allocation. A Beacon frame during BTI 252 is used to transfer the ExSchIE, instead of allocating the ExSchIE in AT 253. In this instance the messaging does not require a confirmation of receipt of the ExSchIE by both STAs before data is transferred by the source STA, in which data may be lost if both STAs are not communicating.

Figure 8:
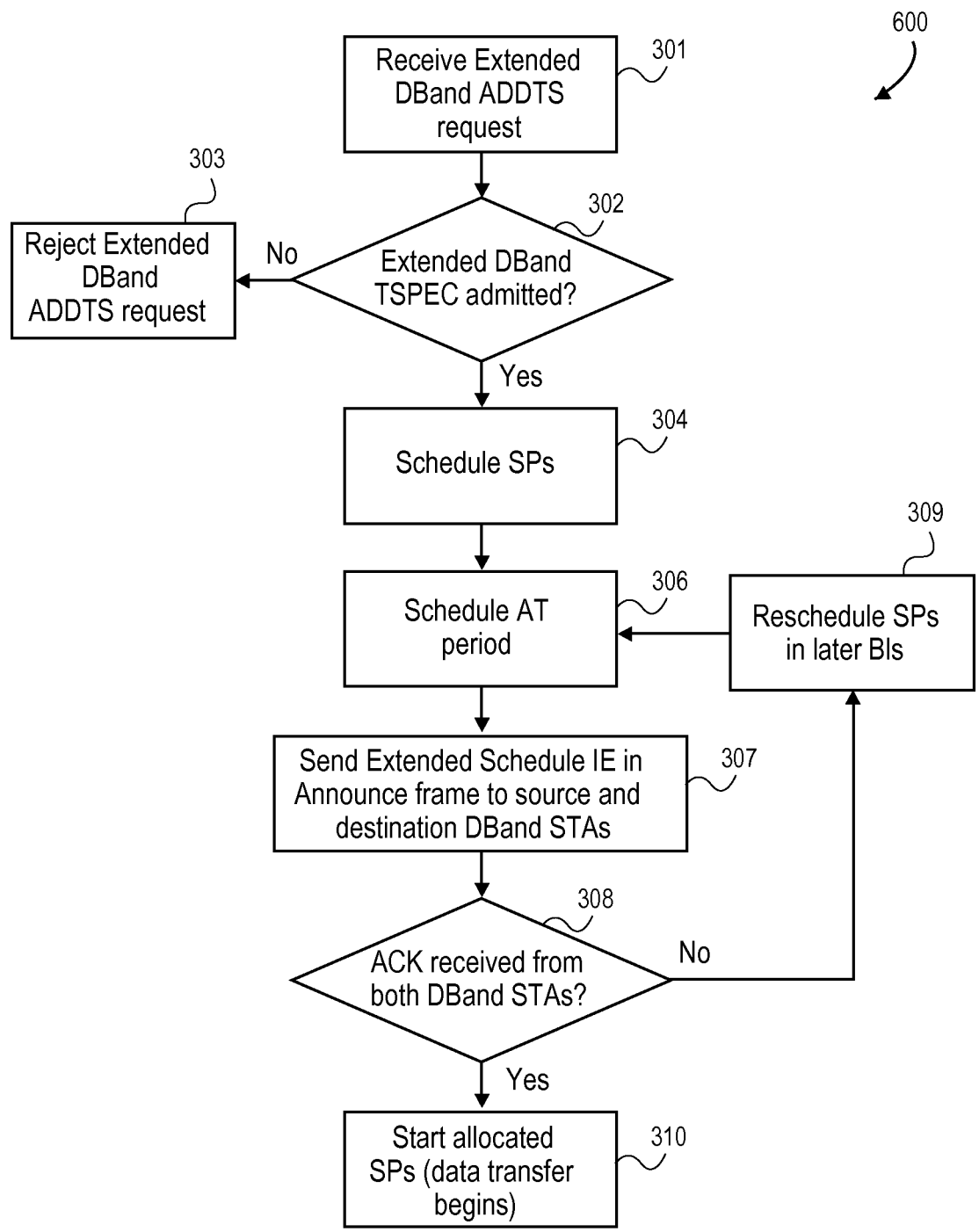
FIG. 8 is a flow chart showing a method for using an Announce frame for any type of SP allocation in practicing one embodiment of the invention.

FIG. 8 illustrates another embodiment for practicing the invention. FIG. 8 illustrates a method 600 which is similar to method 300 of FIG. 5. However, in method 600, no distinction is made between time critical and non-time critical data transfers. Accordingly, blocks 305 and 311 of FIG. 5 are not needed in method 600, since all SP allocations are determined as time-critical. In this instance, all ExSchIE exchanges are performed using AT 253.

Accordingly, either technique described above may be used to practice the invention. In one instance, only some data transfers are programmed for SP allocation using AT 253. In the described embodiment above, time criticality is used as the determining factor for SP allocation using AT 253. It is appreciated that other criteria or requirement may be used in other embodiments. Alternatively, all data transfers may be programmed for SP allocation using AT 253. The use of AT 253 for SP allocation ensures that PCP 210 receives confirmation of the receipt of the SP allocation by the STAs before data transfer is performed.

Accordingly, service period allocation is described. The described service period allocation may be utilized with the 60 GHz standard or any other standard.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
   receiving at a control point device from a source device, a request to allocate a service period for wireless data transfer from the source device to a destination device, wherein wireless communication between the source device and the destination device is under control of the control point device;
   determining that the wireless data transfer from the source device to the destination device meets a particular requirement;
   allocating the requested service period when the particular requirement is met;
   generating an information element (IE) that contains the requested service period for both the destination device and the source device;
   transmitting the IE to each of the source device and the destination device during unicast of an Announcement Time; and
   permitting the wireless data transfer from the source device to the destination device only when a response to the transmitted IE is received from both the source device and the destination device by the control point device.

2. The method of claim 1, wherein determining that the wireless data transfer meets the particular requirement includes determining if the wireless data transfer meets a particular traffic stream specification.

3. The method of claim 2, wherein the particular traffic stream specification pertains to a 60 GHz DBand specification for the wireless data transfer.

4. The method of claim 3, wherein the IE is transmitted in an Announce frame during the Announcement Time as specified in the 60 GHz DBand specification.

5. The method of claim 1, wherein determining that the wireless data transfer meets the particular requirement includes determining if the wireless data transfer is time critical.

6. The method of claim 5, wherein when data does not meet the time critical requirement, generating the IE, but transmitting the IE to the source device and the destination device during a beacon broadcast period, in which the service period allocation is started without a response from both the source device and the destination device.

7. A method comprising:
   receiving at a control point device from a source station, a request to allocate a service period for wireless data transfer from the source station to a destination station, wherein the control point device, source station and destination station are part of a network and wherein wireless communication between the source station and the destination station is under control of the control point device;
   determining that the wireless data transfer from the source station to the destination station meets a particular traffic stream specification;
   allocating the requested service period, with allocation start time set after a delay period to allow the source station and the destination station to respond to an information element (IE), when the particular traffic stream specification is met;
   generating the IE that contains the requested service period for both the source station and the destination station to communicate to transfer data;
   transmitting the IE to each of the source station and the destination station during unicast of an Announcement Time; and
   permitting the wireless data transfer from the source station to the destination station only when a response to the transmitted IE is received from both the source station and the destination station by the control point device.

8. The method of claim 7, wherein the particular traffic stream specification pertains to a 60 GHz DBand specification for the wireless data transfer.

9. The method of claim 8, wherein the IE is transmitted in an Announce frame during the Announcement Time as specified in the 60 GHz DBand specification.

10. The method of claim 9, further including determining when the wireless data transfer is a time critical transfer and allocating the requested service period for transmission by the Announce frame only when meeting a time critical requirement.

11. The method of claim 10, wherein when data does not meet the time critical requirement, generating the IE, but transmitting the IE to the source station and the destination station during a beacon broadcast period, in which the service period allocation is started without a response from both the source device and the destination device.

12. The method of claim 9, wherein the network is a Personal Basic Service Set or an Infrastructure Basic Service Set.

13. The method of claim 9, further including rescheduling the service period when responses to the transmitted IE are not received from at least one of the source station and the destination station by the control point device.

14. An apparatus comprising:
a control point device to receive a request from a source station to allocate a service period for wireless data transfer from the source station to a destination station, wherein the control point device, source station and destination station are part of a network and wherein wireless communication between the source station and the destination station is under control of the control point device, the control point device to determine that the wireless data transfer from the source station to the destination station meets a particular traffic stream specification and to allocate the requested service period when the particular traffic stream specification is met, the control point device to generate an information element (IE) that contains the requested service period for both the source station and the destination station to communicate to transfer data, in which the IE is to be transmitted to each of the source station and the destination station during unicast of an Announcement Time, and the control point device to permit the wireless data transfer from the source station to the destination station only when a response to the transmitted IE is received from both the source station and the destination station by the control point device; and
a directional antenna coupled to the control point device to provide a directional transmission when transmitting the IE to the source and destination stations.

15. The apparatus of claim 14, wherein the particular traffic stream specification pertains to a 60 GHz DBand specification for the wireless data transfer.

16. The apparatus of claim 15, wherein the IE is transmitted in an Announce frame during the Announcement Time as specified in the 60 GHz DBand specification.

17. The apparatus of claim 16, wherein the control point device further determines when the wireless data transfer is a time critical transfer and allocating the requested service period for transmission by the Announce frame only when meeting a time critical requirement.

18. The apparatus of claim 17, wherein when data does not meet the time critical requirement, generating the IE, but transmitting the IE to the source station and the destination station during a beacon broadcast period, in which the service period allocation is started without a response from both the source device and the destination device.

19. The apparatus of claim 16, wherein the network is a Personal Basic Service Set or an Infrastructure Basic Service Set.

20. The apparatus of claim 16, wherein the control point device further reschedules the service period when responses to the transmitted IE are not received from at least one of the source station and the destination station by the control point device.

* * * * *